March 25, 1924.
J. R. THOMAS ET AL
INSECT TRAP
Filed Feb. 21, 1923
1,488,178
2 Sheets-Sheet 1
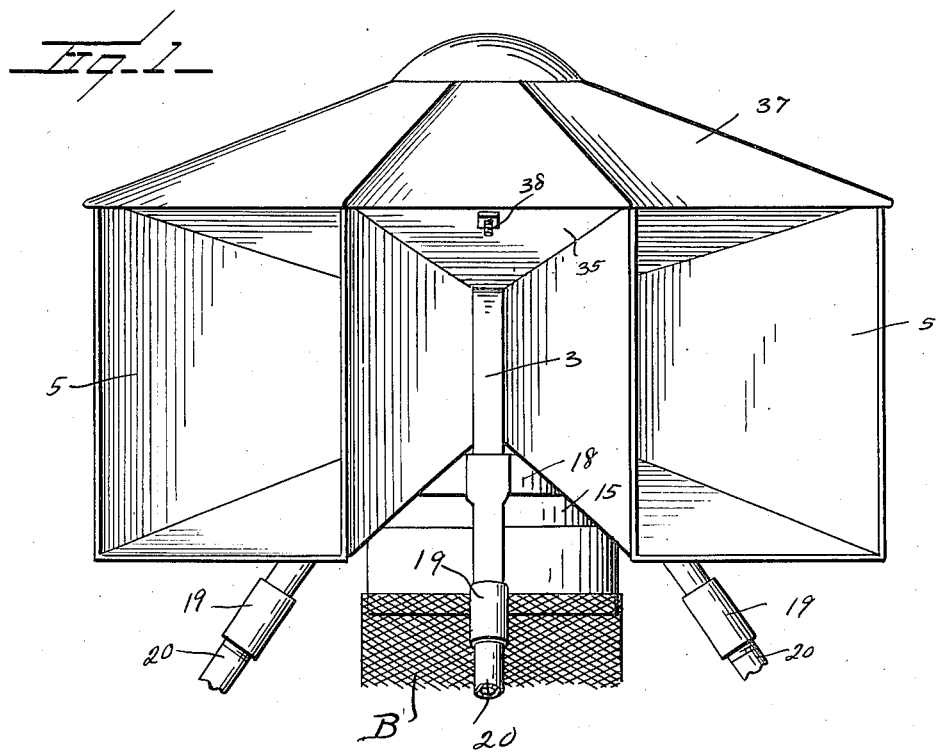
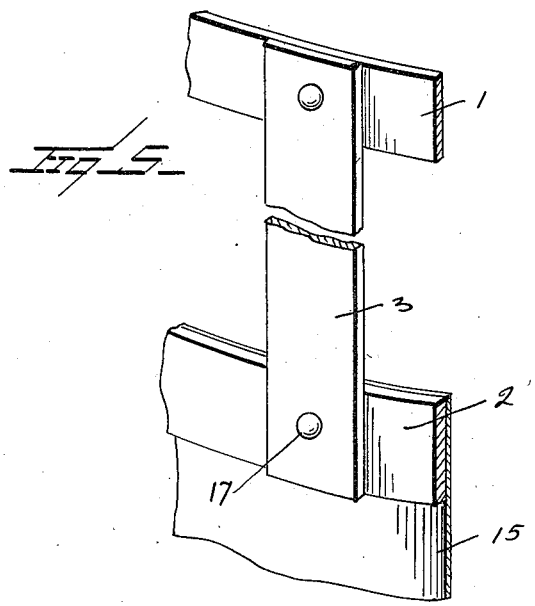
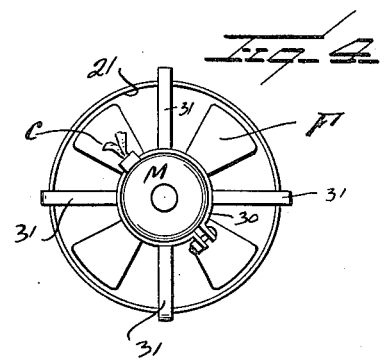
INVENTORS
J. R. Thomas
J. L. Floyd
BY
Watson E. Coleman
ATTORNEY.

March 25, 1924.
J. R. THOMAS ET AL
INSECT TRAP
Filed Feb. 21, 1923
1,488,178
2 Sheets-Sheet 2
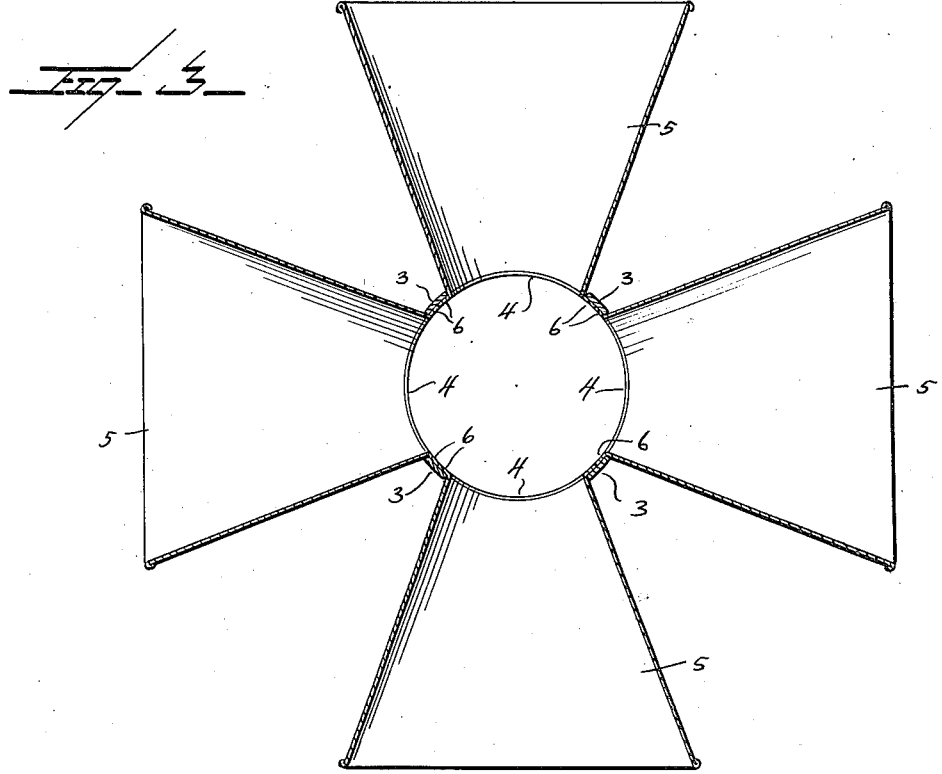
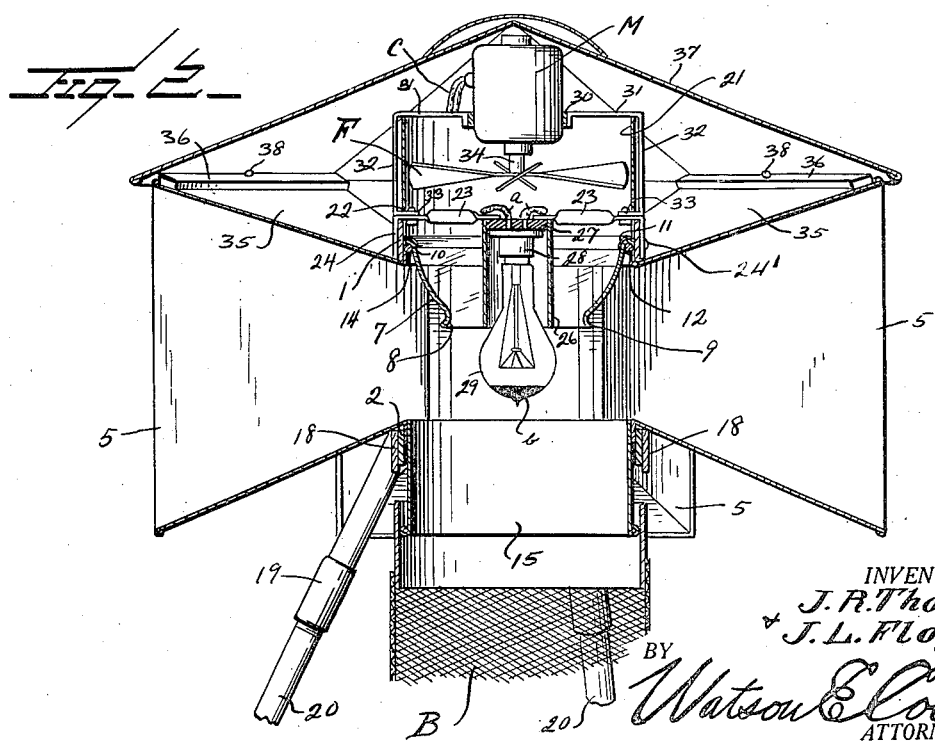
INVENTORS
J. R. Thomas
& J. L. Floyd
BY Watson E. Coleman
ATTORNEY.

Patented Mar. 25, 1924.

1,488,178

UNITED STATES PATENT OFFICE.

JAMES R. THOMAS AND JAMES L. FLOYD, OF KENTON, TENNESSEE.

INSECT TRAP.

Application filed February 21, 1923. Serial No. 620,437.

*To all whom it may concern:*

Be it known that we, JAMES R. THOMAS and JAMES L. FLOYD, citizens of the United States, residing at Kenton, in the county of Obion and State of Tennessee, have invented certain new and useful Improvements in Insect Traps, of which the following is a specification, reference being had to the accompanying drawings.

This invention relates to certain improvements in insect traps and it is an object of the invention to provide a novel and improved device of this general character wherein light is employed as a lure for the insects.

It is also an object of the invention to provide a novel and improved device of this general character which can be employed to advantage in the catching of insects that are attracted by light and particularly such insects that fly at night such as tobacco, cabbage, tomato, corn and orchard flies, the Hessian fly in the wheat fields, moors and the like.

An additional object of the invention is to provide a novel and improved device of this general character embodying one or more reflector horns associated with a light together with pneumatic means for forcing the attracted insects within a collecting receptacle.

The invention consists in the details of construction and in the combination and arrangement of the several parts of our improved insect trap whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:—

Figure 1 is a fragmentary elevational view illustrating an insect trap constructed in accordance with an embodiment of our invention;

Figure 2 is a vertical sectional view taken through the structure as illustrated in Figure 1;

Figure 3 is a horizontal sectional view taken through the reflector horns;

Figure 4 is a fragmentary view in top plan illustrating the mounting for the motor fan;

Figure 5 is a fragmentary view in perspective illustrating the means for connecting the vertically spaced annular members.

As disclosed in the accompanying drawings, 1 and 2 denote a pair of vertically aligned and spaced annular members or rings connected by and maintained in desired spaced relation by the equi-distantly spaced straps 3 providing therebetween an annular series of openings 4, herein disclosed as four in number. In communication with each of the openings 4 is the smaller end portion of a reflector horn 5 herein disclosed as rectangular in cross section with its walls tapered from the outer end thereof to the smaller end. The inner faces of the horn 5 provide reflecting surfaces.

The inner or smaller end portion of each of the horns 5 is provided with flanges 6 overlying the adjacent straps 3 whereby the horn 5 is effectively maintained in applied position.

Snugly fitting within the upper member or ring 1 is the upper marginal portion of a concavo convex member 7 of glass or other transparent material with the convex face thereof downwardly disposed. This member 7 extends a desired distance below the upper member or ring 1 and has its lower or central portion provided with a relatively large opening 8 defined by an outwardly flaring neck or rim 9. The upper marginal portion of the transparent member 7 is defined by an outstanding flange 10 having close contact with an external rim or flange 11 carried by the upper member or ring 1 and underlying said flange 10 is a retaining ring 12 soldered as at 14 or otherwise secured to the member or ring 1 whereby the member 7 is effectively maintained in applied position.

Snugly fitting within the lower member or ring 2 and extending therebelow is a sleeve or barrel 15 of desired length and which is held in applied position by the securing members 17 which also serve to connect the straps 3 and the member or ring 2. A suitable basket generally indicated at B is adapted to be applied to the lower portion of the sleeve or barrel 15, said basket being preferably metallic with its outer wall of copper or galvanized wire screen.

The upper portion of the sleeve or barrel 15 is adapted to be inserted within an annular member or ring 18 provided at equidistantly spaced points and circumferentially thereof with the outwardly and downwardly inclined tubular members 19 with which are engaged, preferably by threaded engagement, the supporting legs 20 so that the device in its entirety may be supported at a desired elevation within a field or other location.

21 denotes a cylindrical housing of requisite dimensions and which is adapted to have one end portion telescopically engaged within the upper member or ring 1. The lower marginal portion of the housing is provided with the recesses or notches 22 through which extend the outer end portions of the arms 23 radiating from a light support 27 positioned at the axial center of the housing 21 adjacent the lower end thereof. The arms 23 provide stops to limit the extent of insertion of the housing 21 within the upper member or ring 1 and the outer end portions of said arms 23 are continued by the depending extensions 24 which overlie and have close contact with the outer face of the ring or member 1 and are secured thereto by the bolts 24' or the like whereby the housing 21 is effectively maintained in applied position.

Secured to and depending from the light support 27 is an elongated cylindrical member 26 extending below the housing 21 and within the transparent member 7, said member 26 serving as a shade for the upper portion of the bulb 29, although the use of this member 26 is not essential.

Carried by the under face of the supporting member 27 is a lamp socket 28 adapted to have suitable connection through the conductors $a$ with a source of electrical energy. Associated with the socket 28 is an incandescent bulb 29 which extends below the lower end of the cylindrical member 26 and positioned at substantially the axial center of each of the reflector horns 5. The lower or bottom portion of the bulb 29 is preferably opaque as indicated at $b$.

Positioned at the upper portion of the housing 21 at substantially the axial center thereof is a clamping ring 30 adapted to provide a support for the motor M, said motor being of an electrical type and in desired connection with the source of electricity through the conductors $c$. Radiating from the ring 30 are the arms 31 extending over and terminating outwardly but in close proximity to the upper end of the housing 21 and continued by the depending arms 32. The arms 32 terminate in the feet 33 resting upon the outer end portions of the arms 23 and are bolted or otherwise secured thereto. The shaft 34 of the motor M is downwardly disposed and has fixed thereto the fan F which operates to force a draft of air downwardly through the member 7 axially through the lower member or ring 2 whereby the insects lured by the bulb 29 will be forced within the coacting basket associated with the barrel or sleeve 15 hereinbefore referred to.

The upper portions of adjacent reflector horns are connected by the interposed plates 35 the outer end portions of said plates having secured thereto the upstanding cross members or cleats 36.

A cover member 37 substantially concavo convex in form is positioned above the horns 5 and the motor M. The marginal portion of the cover 37 being secured to the cleats 36 by the bolts 38 or the like, each of said bolts being soldered, welded or otherwise secured to the cover member 37.

In practice, the light rays emitted by the bulb 29 and passing through the horns 5 attract the insects and as said insects pass inwardly through the horns 5 the air draft, as created by the fan F, forces the insects within the basket B.

The member 7 hereinbefore referred to serves to reduce the draft of air passing downwardly from the housing 21 and in a manner whereby the draft is thrown toward the center around the bulb 29 to assure a straight downward passage of the draft through the ring 15 and into the receptacle B without obstruction. This member 7 also serves to prevent the air draft from spreading and passing out through the horns 5.

From the foregoing description it is thought to be obvious that an insect trap constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

1. An insect catcher comprising a pair of spaced members, straps connecting the members and maintaining the same in spaced relation, said straps providing a plurality of openings therebetween, a reflector horn in communication with each of the openings, a barrel depending from the lower member, a housing supported by the upper member, an illuminating member carried by the housing and positioned inwardly of the reflector horns, and means carried by the housing for creating a down draft.

2. An insect catcher comprising a pair of spaced members, means for maintaining the same in spaced relation, a reflector horn operatively supported by said spaced members, a housing telescopically engaged with the upper spaced member, a support within said housing, arms extending outwardly from the support and exteriorly of the housing, said arms limiting the telescopical engagement of the housing with respect to the member, means for securing said arms to the member, and a lighting unit carried by the support.

3. An insect catcher comprising a pair of spaced members, means for maintaining the same in spaced relation, a reflector horn operatively supported by said spaced members, a housing telescopically engaged with the upper spaced member, a support within said housing, arms extending outwardly from the support and exteriorly of the housing, said arms limiting the telescopical engagement of the housing with respect to the member, means for securing said arms to the member, a lighting unit carried by the support, and a fan supported within the housing, said fan operating to create a down draft.

4. An insect catcher comprising a pair of spaced members, means for maintaining the same in spaced relation, a reflector horn operatively supported by said spaced members, a housing telescopically engaged with the upper spaced member, a support within said housing, arms extending outwardly from the support and exteriorly of the housing, said arms limiting the telescopical engagement of the housing with respect to the member, means for securing said arms to the member, a lighting unit carried by the support, arms overlying the housing and extending inwardly thereof, means for securing said last named arms to the first named arms, a clamping member secured to the inner portions of the second named arms, and a fan operatively supported by the clamping member, said fan operating to create a down draft.

5. An insect catcher comprising a pair of spaced members, means for maintaining the same in spaced relation, a reflector horn operatively supported by said spaced members, a housing telescopically engaged with the upper spaced member, a support within said housing, arms extending outwardly from the support and exteriorly of the housing, said arms limiting the telescopical engagement of the housing with respect to the member, means for securing said arms to the member, a lighting unit carried by the support, arms overlying the housing and extending inwardly thereof, means for securing said last named arms to the first named arms, a clamping member secured to the inner portions of the second named arms, a motor held by the clamping member and provided with a depending shaft, and a fan carried by said shaft, said fan operating to create a down draft.

In testimony whereof we hereunto affix our signatures.

JAMES R. THOMAS.
JAMES L. FLOYD.